(12) United States Patent
Lisuwandi

(10) Patent No.: US 9,524,824 B2
(45) Date of Patent: Dec. 20, 2016

(54) DRIVER FOR WIRELESS POWER TRANSMITTER SENSING REQUIRED TRANSMIT POWER FOR OPTIMUM EFFICIENCY

(71) Applicant: Linear Technology Corporation, Milpitas, CA (US)

(72) Inventor: Eko Tan Lisuwandi, Andover, MA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 14/932,891

(22) Filed: Nov. 4, 2015

(65) Prior Publication Data

US 2016/0072310 A1    Mar. 10, 2016

Related U.S. Application Data

(62) Division of application No. 13/862,200, filed on Apr. 12, 2013, now Pat. No. 9,305,700.

(Continued)

(51) Int. Cl.
*H02J 7/00* (2006.01)
*H02J 7/04* (2006.01)
(Continued)

(52) U.S. Cl.
CPC .......... *H01F 38/14* (2013.01); *H02J 5/005* (2013.01); *H02J 7/0052* (2013.01); *H02J 7/025* (2013.01);
(Continued)

(58) Field of Classification Search
USPC ............... 320/107, 108, 117, 118, 119, 112, 134,320/126, 121, 120, 103, 162, 128; 307/66, 71, 307/26, 46, 80, 110
See application file for complete search history.

(56) References Cited

U.S. PATENT DOCUMENTS 5,714,863 A * 2/1998 Hwang ................. H02M 3/158
320/166
6,140,799 A * 10/2000 Thomasson ......... H01M 10/441
320/117

(Continued)

FOREIGN PATENT DOCUMENTS

CN        102165667 A     8/2011
EP        1962402 A2      8/2008
(Continued)

OTHER PUBLICATIONS

CN Application No. 102135732, Taiwan National Stage filing of U.S. Appl. No. 13/862,200, First Office Action and search report, 3 pages.

(Continued)

*Primary Examiner* — Alexis A Boateng
(74) *Attorney, Agent, or Firm* — Patent Law Group LLP; Brian D. Ogonowsky

(57) ABSTRACT

An auto-resonant driver for a transmitter inductor drives the inductor at an optimal frequency for maximum efficiency. The transmitter inductor is magnetically coupled, but not physically coupled, to a receiver inductor, and the current generated by the receiver inductor is used to power a load. The system may be used, for example, to remotely charge a battery (as part of the load) or provide power to motors or circuits. A feedback circuit is used to generate the resonant driving frequency. A detector in the transmit side wirelessly detects whether there is sufficient current being generated in the receiver side to achieve regulation by a voltage regulator powering the load. This point is achieved when the transmitter inductor peak voltage suddenly increases as the (Continued)

driving pulse width is ramped up. At that point, the pulse width is held constant for optimal efficiency.

10 Claims, 10 Drawing Sheets

Related U.S. Application Data

(60) Provisional application No. 61/709,398, filed on Oct. 4, 2012.

(51) Int. Cl.
  *H01F 38/14* (2006.01)
  *H02J 7/02* (2016.01)
  *H04B 5/00* (2006.01)
  *H02J 5/00* (2016.01)
  *H01M 10/44* (2006.01)
  *B60L 11/18* (2006.01)

(52) U.S. Cl.
  CPC .......... *H04B 5/0037* (2013.01); *B60L 11/1853* (2013.01); *H01M 10/441* (2013.01); *H02J 7/0016* (2013.01); *H02J 7/0024* (2013.01)

(56) References Cited

U.S. PATENT DOCUMENTS

| | | |
|---|---|---|
| 6,518,733 B1 | 2/2003 | Schenkel et al. |
| 7,501,720 B2 * | 3/2009 | Popescu-Stanesti .. H02J 7/0018 307/66 |
| 7,782,036 B1 | 8/2010 | Wong et al. |
| 8,004,235 B2 | 8/2011 | Baarman et al. |
| 8,174,856 B2 * | 5/2012 | Chapman ................ H02J 3/383 307/82 |
| 8,198,835 B2 * | 6/2012 | Yokoyama ................ B25F 5/00 318/139 |
| 8,890,493 B2 | 11/2014 | Isik |
| 8,928,177 B2 | 1/2015 | Suzuki et al. |
| 2004/0130299 A1 | 7/2004 | Pietkiewicz et al. |
| 2008/0079392 A1 | 4/2008 | Baarman et al. |
| 2009/0085515 A1 * | 4/2009 | Bourilkov ............. H02J 7/0024 320/117 |
| 2010/0084918 A1 | 4/2010 | Fells et al. |
| 2011/0169446 A1 | 7/2011 | Kondo |
| 2011/0193525 A1 * | 8/2011 | Ro ........................ H02J 7/0016 320/116 |
| 2013/0249219 A1 * | 9/2013 | Kim ........................ H02J 7/007 290/36 R |
| 2014/0097791 A1 | 4/2014 | Lisuwandi |

FOREIGN PATENT DOCUMENTS

| | | |
|---|---|---|
| EP | 2293423 B1 | 10/2012 |
| TW | I367617 | 7/2012 |

OTHER PUBLICATIONS

PCT/US2013/062129, "International Search Report and Written Opinion", Oct. 6, 2014, 19 pages.

* cited by examiner

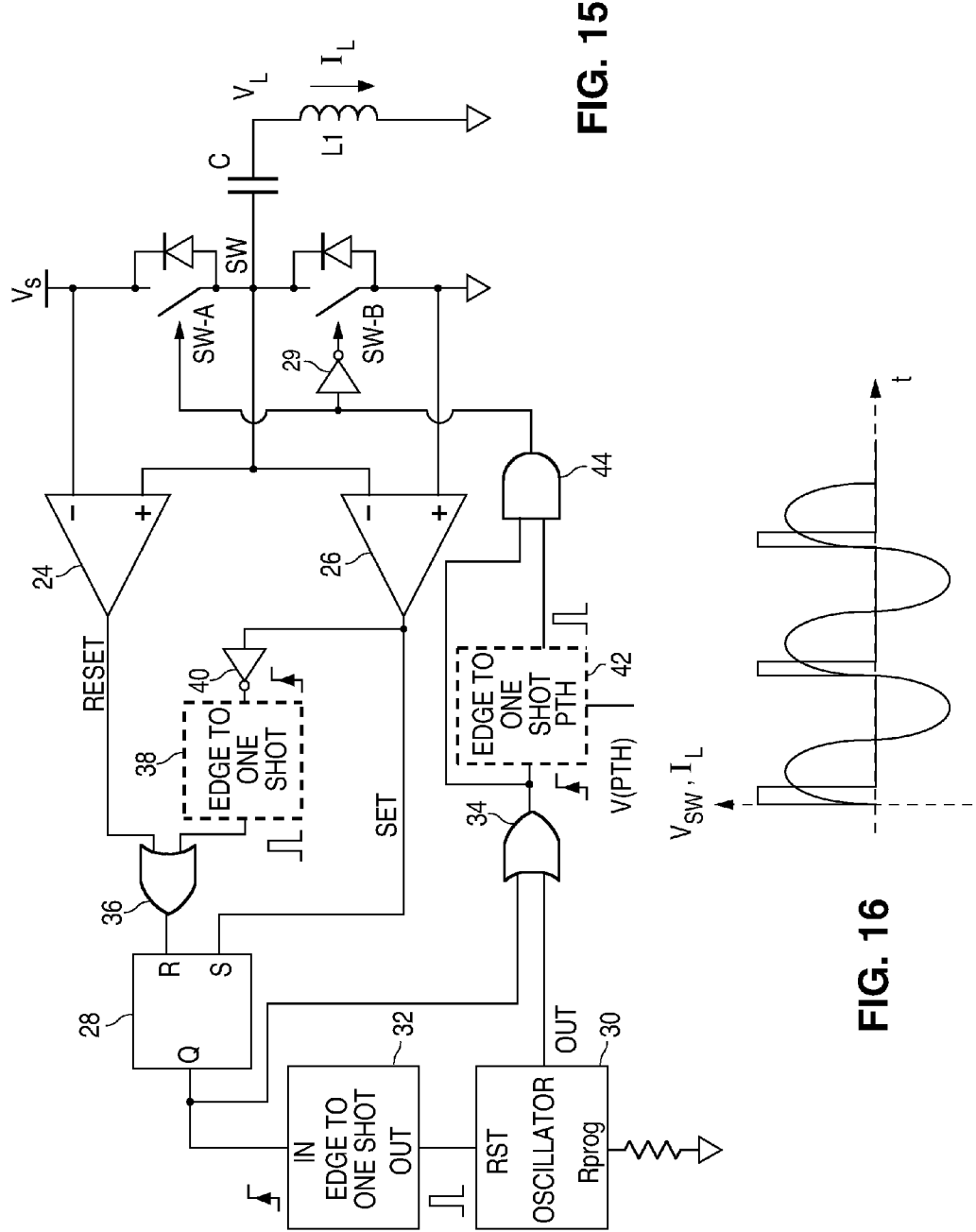

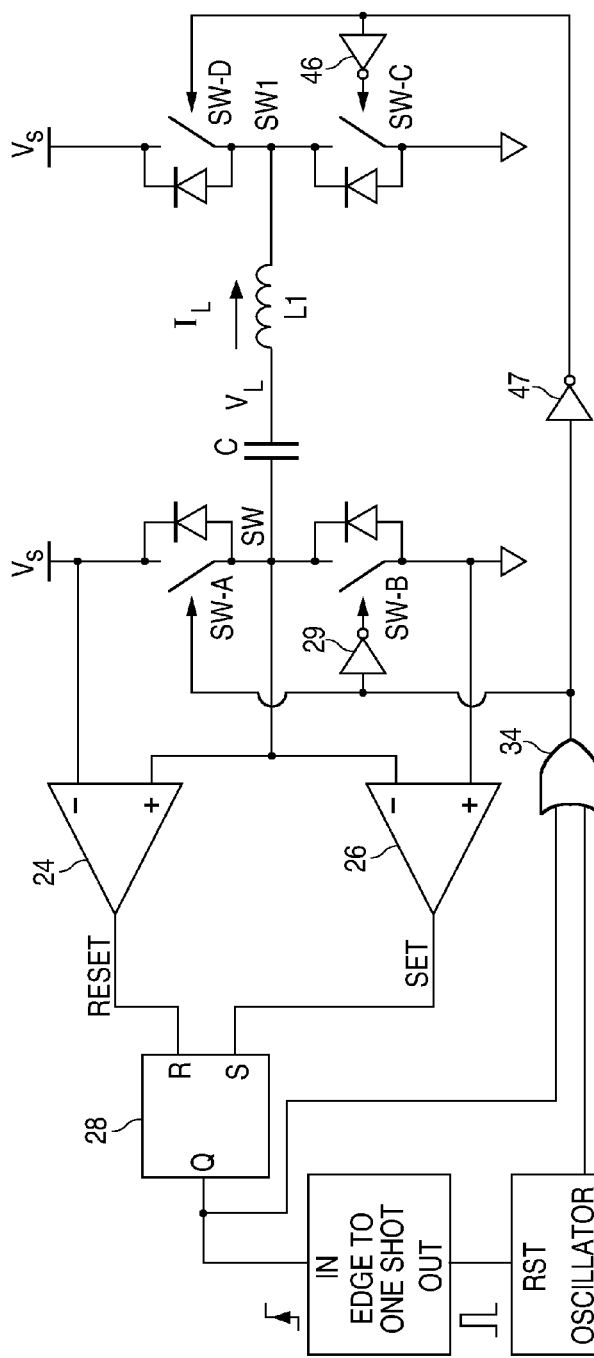
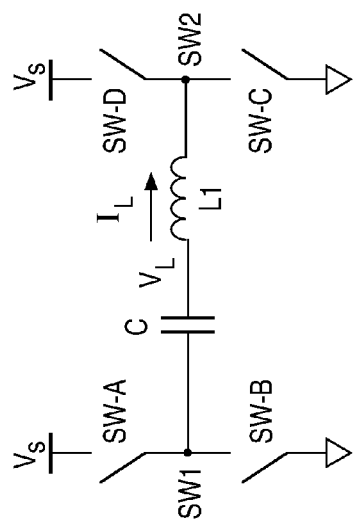
FIG. 18
FIG. 17

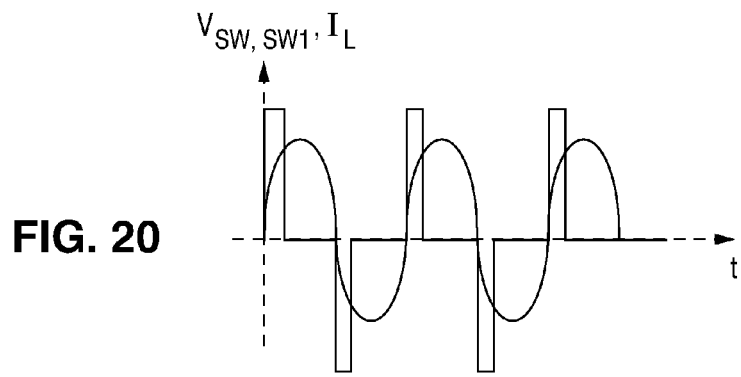
FIG. 20
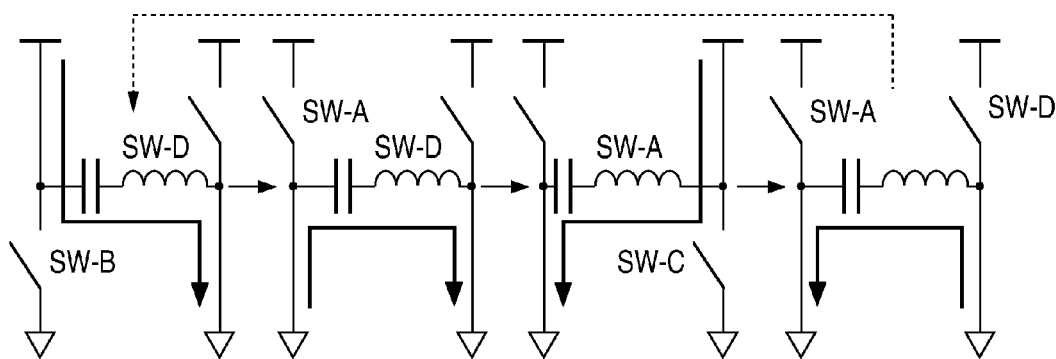
FIG. 21A   FIG. 21B   FIG. 21C   FIG. 21D
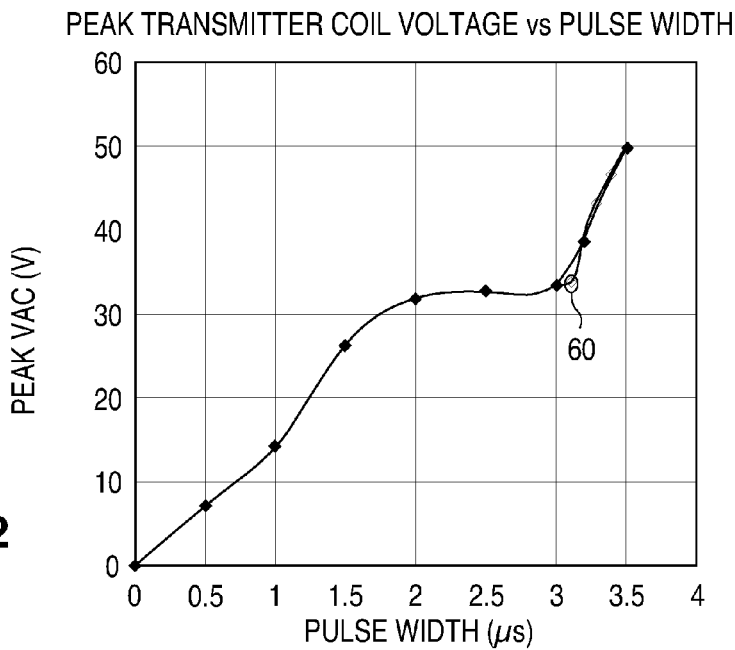
FIG. 22

DRIVER FOR WIRELESS POWER TRANSMITTER SENSING REQUIRED TRANSMIT POWER FOR OPTIMUM EFFICIENCY

CROSS-REFERENCE TO RELATED APPLICATIONS

This application is a divisional of U.S. patent application Ser. No. 13/862,200, filed Apr. 12, 2013, by Eko Tan Lisuwandi, which is incorporated herein by reference.

FIELD OF THE INVENTION

This invention relates to the wireless transmission of power to a device, such as for recharging a battery in a portable device or remotely powering devices, and, in particular, to such a system using an auto-resonant power transmitter.

BACKGROUND

Recently there is growing interest to develop wireless power transfer systems to power various devices from consumer electronics such as cell phones to heavy duty industrial equipment such as motors at the end of a crane. The main driving force behind this interest is the ability of such wireless power transfer systems to remove the direct electrical contact necessary to deliver power from a source to a load in a traditional wire-connected system. The removal of such electrical contact promise many advantages, including convenience, reduced maintenance cost, and reliability.

In a typical wireless power transfer system, shown in FIG. 1, a transmit inductor L1 is energized by a transmitter circuit 12, powered by a voltage source 13, to transmit a time varying magnetic field. A receive inductor L2 is then placed in the generated magnetic field, inducing a similarly time varying current that flows in the receive inductor L2. This induced current can be used to generate an AC voltage in a receiver circuit 14, which in turn can then be rectified at the receiver output to produce a DC voltage capable of delivering DC current to power a load $R_L$ on the receiver side. The load may be a battery to be recharged or a circuit. The receiver circuit 14 may be located inside the housing that also houses the load, such as a cell phone or other hand-held device. The transmitter circuit 12 may be located in a support platform on which the cell phone is placed, such as overnight, for recharging its battery.

In most practical wireless power transfer system, the amount of magnetic field that reaches the receiver inductor L2 is relatively small compared to traditional transformer-based isolated systems. An often used measure of how much magnetic field generated by the transmitter inductor L1 reaches the receiver inductor L2 is called coupling, represented by a coupling coefficient k between 0 and 1. Systems that have a coupling coefficient less than 0.8 often employ resonant circuits in the transmitter circuitry to generate enough current in the transmit inductor L1. This relatively large transmit inductor L1 current is required to generate the strong magnetic field needed to induce a sufficient current in the receive inductor to power the load.

Note that a resonance circuit is often also employed on the receive side. By tuning the resonance circuit on the receive side to the same frequency as the frequency at which the magnetic field is changing, the resonance circuit provides a preferred path for the magnetic field to close its loop (note that magnetic field lines always have to close a loop on itself since we do not have a magnetic monopole). Therefore, the resonance circuit at the receiver helps to reshape the local magnetic field around the receive inductor L2 and increases the field density such that a relatively larger amount of current can be induced in the inductor.

In a resonant receiver, this AC-current flows back and forth between the receive inductor L2 and a capacitor in the receiver circuit 14, generating a voltage. A larger induced current generates a larger peak voltage which can then be more easily rectified and potentially regulated, producing the desired voltage for the receiver load.

On the transmit side, a common resonance circuit used to generate the AC current in the transmit inductor is shown in FIG. 2. FIG. 2 illustrates a half bridge driver driving an LC tank circuit. Switches SW-A and SW-B are driven at a particular frequency and at a particular duty cycle. This frequency is usually determined by sweeping a certain frequency range and monitoring the voltage $V_L$ generated across the transmit inductor L (transmit inductor L1 in FIG. 1). When the amplitude of the voltage $V_L$ is at a maximum, the driving frequency is then determined to be equal to the natural frequency of the LC tank. The duty cycle of switch SW-A with respect to switch SW-B can also then be controlled to regulate the peak amplitude of $V_L$, which corresponds to the peak amplitude of current $I_L$ at this LC tank natural frequency. Note that in normal operation, switches SW-A and SW-B are never on simultaneously. However, the presence of the diodes D1 and D2 allows the two switches to be off simultaneously while maintaining the SW node voltage within a diode drop of the supply voltage $V_S$ or ground.

Note that the LC tank circuit's natural frequency often does not stay fixed at one value during the course of the circuit operation. For example, the capacitor and transmit inductor used usually have a temperature coefficient, which means that the natural frequency of the tank will shift with temperature variation. And since we are developing a relatively large amount of AC current in this inductor and capacitor, a temperature increase of 20 to 30 degrees in this capacitor and inductor is relatively common. Another common effect is the shift in the natural frequency when a receiver inductor is coupled at different or changing coupling coefficients.

All these varying effects require that the frequency sweeping to find the natural frequency needs to be repeated at regular intervals to ensure that switches SW-A and SW-B are driven at the LC tank's natural frequency. The need to continually search for this natural frequency and the duty cycle modulation control usually means that complex digital circuitry is involved. More often than not this necessitates the use of a microprocessor to implement a custom algorithm.

What is needed is a transmission technique, for wirelessly transmitting power to a load, which sets the natural frequency of a tank circuit in a more cost-effective manner.

Another problem with prior art transmission systems for wirelessly transmitting power to a load is that the transmit power is typically set for a worse case load scenario. Therefore, if the load on the receiver side does not need much power, the transmit power is excessive and wasted. Accordingly, what is also needed is a technique that efficiently controls the amount of transmission power to only be that actually required for the load.

SUMMARY

An efficient transmission and receive system for wirelessly supplying power to a load is disclosed. The transmission circuit includes an LC tank circuit operated at its natural frequency for maximum transmitted power and efficiency.

The present invention automatically detects the LC tank circuit's natural frequency and, on a cycle by cycle basis, adjusts the driving frequency of its switches so that it always tracks the natural frequency of the tank circuit. An example circuit is also provided showing that this method is compatible with duty cycle modulation.

In other words, the resonant power transmitter has its driving frequency locked onto the natural frequency of the resonant tank to create an auto-resonant circuit. The method and circuits also allow the modulation of the pulse width of the driving waveform to control the amount of circulating current in the resonant tank.

In addition to this method and circuit, a new detection method is also disclosed that allows control of the transmitted power to reduce the standing power and optimize overall system efficiency. Therefore, the transmitter circuit does not have to operate at full power when the load does not require it. The method modulates the pulse width or the amplitude of the driving waveform of the auto-resonant circuit and monitors the incremental change in the peak voltage generated in the transmitter resonant tank. The peak voltage is then regulated to where the incremental change just starts to increase. This peak voltage reflects the overall quality (Q) factor of the resonant power transfer system. The Q factor changes once a voltage regulator in the receive circuit (providing DC power to the load) achieves regulation, since the reflected impedance from the receiver circuit to the transmitter circuit changes when there is regulation. The transmitter power does not need to be any greater than the minimum needed for the voltage regulator in the receiver circuit to achieve regulation. This quality factor detection method can be extended to include any power transfer system with secondary side regulation and where direct electrical connection from the secondary to the primary side is not desirable.

Other embodiments are described.

BRIEF DESCRIPTION OF THE DRAWINGS

FIG. 15 adds pulse width control to the circuit of FIG. 9 to control the peak inductor current.

FIG. 16 illustrates the controlled pulse width and the resulting inductor current of FIG. 15 at steady state.

FIG. 17 illustrates a full bridge controlling the current through the inductor.

FIG. 18 illustrates the control circuit of FIG. 9 controlling the full bridge of FIG. 17.

FIG. 20 illustrates the controlled pulse widths and the resulting inductor current in the circuit of FIG. 19 at steady state.

FIGS. 21A, 21B, 21C, and 21D illustrate four phases during the operation of the switches in FIG. 19.

FIGS. 22 and 23 illustrate the rapid increase of the peak inductor voltage when the voltage regulator in the receiver achieves regulation (duty cycle less than 100%) as the driving pulse width (or supply voltage) for driving the transmitter inductor is linearly ramped up.

Elements that are the same or equivalent are labeled with the same numeral.

DETAILED DESCRIPTION

Simple Resonate Circuit

Figure 2:
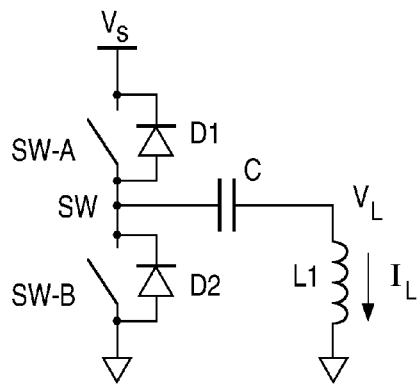
FIG. 2 illustrates a prior art half bridge circuit for driving the transmitter inductor.
Figure 3:
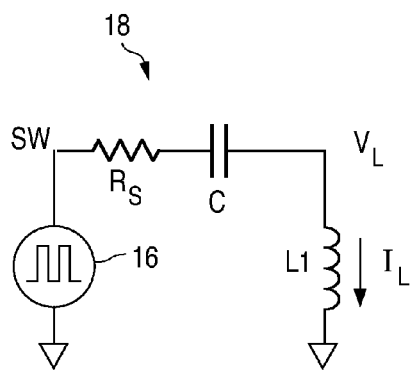
FIG. 3 illustrates the switches in FIG. 2 as a voltage source generating a pulse train.
Figure 4:
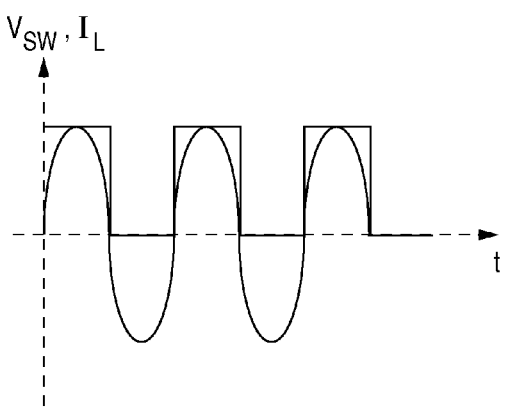
FIG. 4 illustrates the current through the inductor of FIG. 3 at resonance steady state.

FIG. 3 shows a voltage source 16 generating a square wave driving a simple LC resonant circuit 18 at the LC natural frequency ($f_n=1/2\pi\sqrt{LC}$). The voltage source 16 incorporates ideal versions of the switches SW-A and SW-B in FIG. 2. At steady state and at a 50% duty cycle of each switch (for maximum current), the voltage at the SW node and the current through the inductor L is shown in FIG. 4. One characteristic that is clear from the waveform is that, at steady state, the fundamental of the switching waveform at the SW node and the sinusoidal current through the inductor L is in phase.

Figure 5:
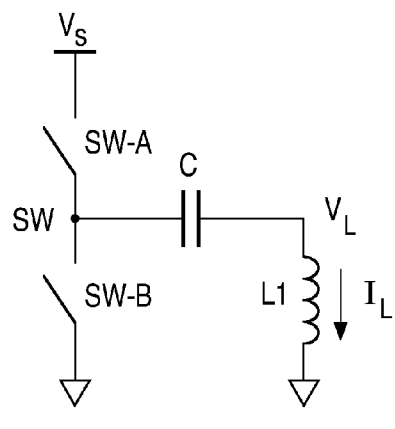
FIG. 5 illustrates a simplified transmitter circuit driving a tank circuit.
Figure 6:
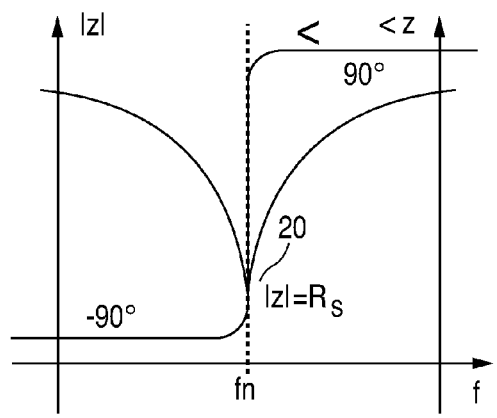
FIG. 6 illustrates the impedance of the tank circuit over a range of frequencies, including the resonant frequency.

FIG. 5 shows the equivalent of FIG. 3 in a half bridge configuration, with the switches' SW-A and SW-B on resistances each equal to Rs. If we drive SW-A and SW-B at 50% duty cycle at the LC natural frequency, the voltage at the SW node and the current through the inductor L at steady state is exactly the same as shown in FIG. 4. Another way of interpreting this is using the series LC-impedance-curve of FIG. 6, which shows the impedance variation of the LC network across a wide frequency range. Note that by driving switches SW-A and SW-B at the LC resonance frequency, the circuit is forced to operate at its minimum real impedance at point 20 when its phase is equal to zero (i.e., only resistance is present and no reactance).

Figure 7:
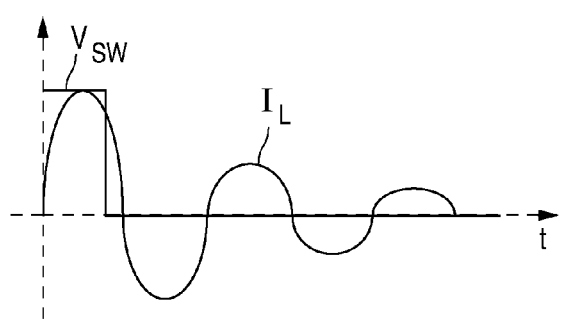
FIG. 7 illustrates the current generated in the tank circuit of FIG. 3 in response to a single voltage pulse.

Keeping in mind that SW-A and SW-B are never on simultaneously, FIG. 7 shows the waveforms that are created when switch SW-A is turned on momentarily for a single pulse and switch SW-B is then turned on. Note that the pulse duration is not important (it can be greater or less than a half period of the natural frequency of the LC tank); only the presence of the voltage change at the SW node is crucial. As shown, an inductor current $I_L$ is generated and it continues to flow back and forth (goes positive and negative) until the energy generated by the single pulse is dissipated in the switch SW-B (or both switches) on-resistance. There are two things that are important to note from FIG. 7. The first is the fact that the inductor current $I_L$ changes direction (positive to negative) at the LC natural frequency. The second is that this same current flows into either one of the switches, and that we can use the on resistances of these same switches to detect this current direction.

When switch SW-A is on, a positive inductor current $I_L$ will cause the voltage at the SW node to be slightly below $V_S$, and a negative inductor current $I_L$ will cause the voltage at the SW node to be slightly above $V_S$. Similarly when switch SW-B is on, a positive inductor current $I_L$ will cause the voltage at the SW node to be slightly below ground, and a negative inductor current $I_L$ will cause the voltage at the SW node to be slightly above ground.

In a typical prior art resonant tank driver circuit, the inductor in the tank circuit is magnetically coupled to a second inductor that drives the switch at one particular resonant frequency. Such a resonant drive circuit may not be suitable with a wireless power transfer system since the magnetic coupling between the receiver inductor and the transmit inductor, as well as the receiver load, may affect the resonant frequency of the overall system. Accordingly, a different approach must be used Auto Resonant Circuit FIG. 8, in one embodiment of the present invention, shows a circuit comprising two comparators 24 and 26 that detect the direction change of the inductor current $I_L$ described above. Completing the circuit with an RS latch 28 and an inverter 29, the circuit drives the switches accordingly to ensure that the waveform at the SW node is in phase with the inductor current $I_L$. The switches may be, for example, MOSFET or bipolar transistors. The diodes in parallel with the switches may be the body-drain diode in a MOSFET with the source shorted to the body.

At the negative to positive inductor current transition while switch SW-B is on, the SW node goes from slightly positive to slightly negative. At this point the RS latch is set and SW-A is turned on. At the positive to negative inductor current transition while SW-A is on, the SW node goes from slightly below $V_S$ to slightly above $V_S$. At this point the RS latch is reset and SW-B is turned on. Note that the RS latch may be reset or set dominant without affecting the operation of the circuit. This cycle repeats as long as there is energy stored in the LC tank.

This circuit allows the SW node to be driven in phase with the inductor current at the LC natural frequency, where $f=1/2\pi\sqrt{LC}$. The driving frequency automatically adjust to changes in the natural frequency of the system due to variation in the L or C values caused by temperature, coupling of other inductors or any other factors. In essence, the circuit ensures that the impedance network is driven at its lowest resistance point (zero phase and lowest magnitude). This type of circuit operation will be referred to as Auto Resonant. The logic states may be reversed while accomplishing the same function.

Figure 8:
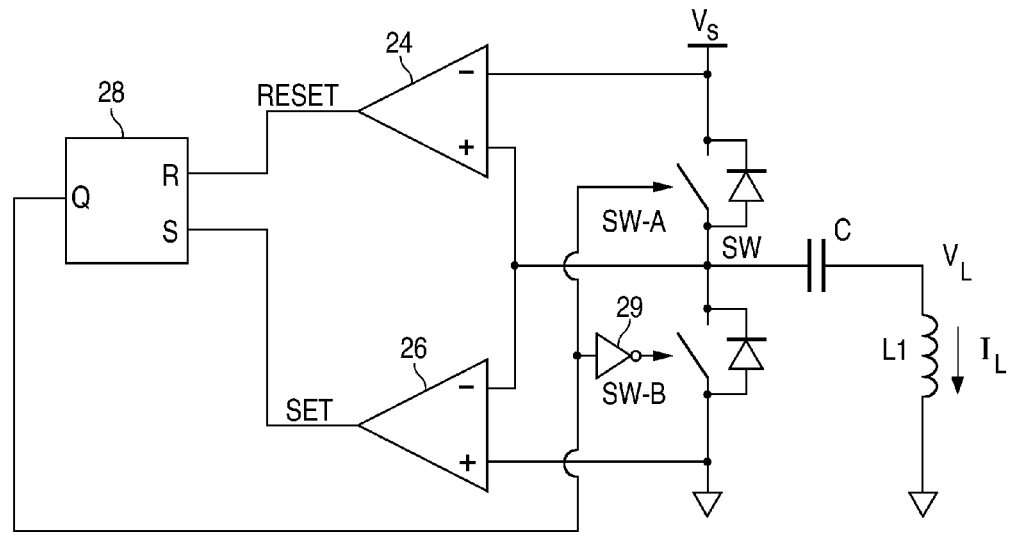
FIG. 8 illustrates a control circuit, in accordance with one embodiment of the invention, that drives the tank circuit at its resonant frequency.
Figure 9:
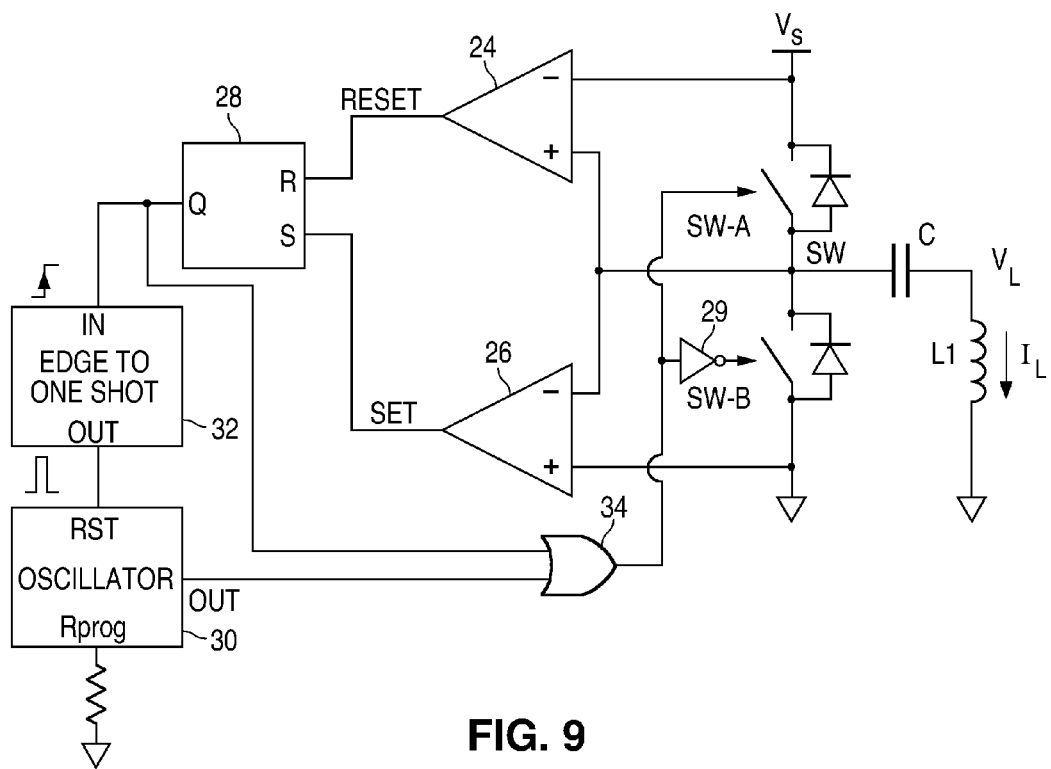
FIG. 9 illustrates the control circuit of FIG. 8 with the addition of an oscillator for initiating the switching.

The circuit of FIG. 8 has startup issues since, at the beginning of the circuit operation, there may not be any energy stored in the LC tank. Therefore, a startup oscillator is added to give the series LC network initial impulse of energy, as shown in FIG. 9. The oscillator 30 is reset every time the RS latch 28 produces an edge (here the positive edge is used but a negative edge can also be used), allowing the auto resonant circuit to take over once there is enough initial energy stored in the LC tank. An edge-to-one-shot circuit 32 produces the reset pulse.

The startup oscillator 30 is programmed to drive switches SW-A and SW-B at a frequency lower than the natural frequency of the LC tank ($f_{start}$). The duty cycle and the exact frequency of the oscillator 30 output are not too important. The important point is for switches SW-A and SW-B to be driven to create pulses at the SW node in order to start developing energy at the LC tank and for current to start flowing in the series LC network.

Once current is developed, the two comparators 24 and 26 can begin their job detecting the direction of the inductor current $I_L$ and start driving switches SW-A and SW-B to be in phase with this current. Once the two comparators 24 and 26 are operating, the startup oscillator 30 should not produce any more edges at its output. Therefore, on every rising (or falling) edge output of the RS latch 28, a reset pulse is sent to the oscillator 30 that will prevent it from producing an output for a single period. Therefore, $f_{start}$ needs to be programmed to be lower than the natural frequency of the system ($f_n$). The RS latch 28 then controls the switches SW-A and SW-B at the natural frequency via the OR gate 34 and inverter 29.

Note that this configuration also has the advantage of having the startup oscillator 30 immediately producing edges at its output if the energy in the LC tank for any reason is removed or depleted in a short period of time (less than a single period of the natural frequency).

The auto-resonant circuit implementations in FIGS. 8 and 9 use the switches' SW-A and SW-B on-resistance to determine the transmitter $T_X$ inductor current $I_L$ direction. The circuit can be simply modified to use other methods to detect this inductor current $I_L$ direction. Examples of these other methods include: using a series sense resistor with the transmitter inductor, or using a secondary inductor coupled to the primary transmitter inductor.

Auto Resonant in an Inductively Coupled System

Figure 10:
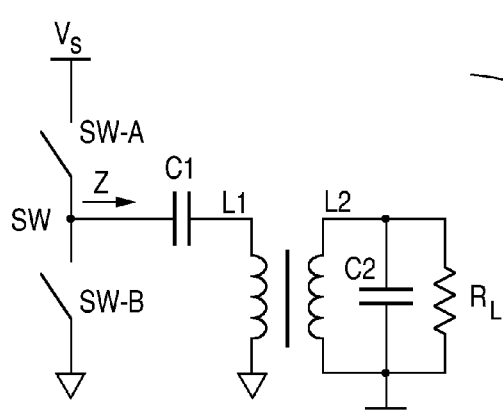
FIG. 10 illustrates the coupling of the transmitter inductor and receiver inductor.

FIG. 10 shows a half bridge driving a series LC network (using C1 and L1) whose inductor L1 is magnetically coupled to a receiver inductor L2 in parallel with a capacitor C2 and a resistor $R_L$. FIG. 10 may represent an embodiment of the invention when controlled in accordance with the invention. The inductor L2 circuit may be housed along with the load RL and spaced from the transmitter inductor L1, such as for wirelessly recharging a battery in a hand-held device. The load $R_L$ would include the battery, a regulator, and other control circuitry. The impedance curve looking at the SW node into the LC network is shown in FIG. 11.

Note that there may be multiple points in the impedance curve where the phase is zero (i.e., the points where the voltage and the current driving it are in phase). Therefore, when using the auto resonant circuit to drive this system, there may be several valid frequencies at which the circuit will settle to drive the switches.

Figure 11:
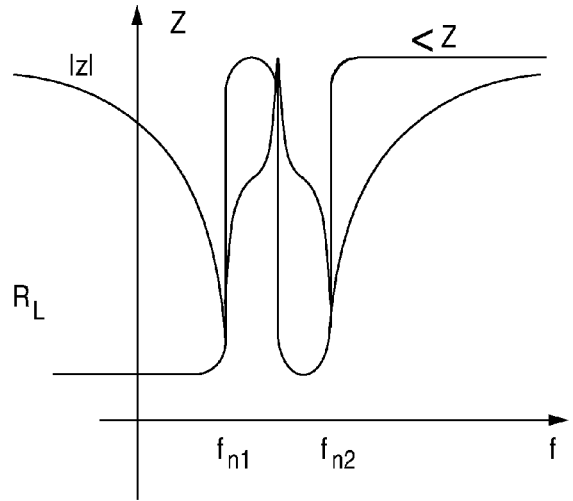
FIG. 11 illustrates the impedance of the tank circuit of FIG. 10 over a range of frequencies.

In the simplified curve shown in FIG. 11, the two valid points are indicated by $f_{n1}$ and $f_{n2}$. The auto resonant driver will find the lowest magnitude, zero phase impedance point, not the highest, as more energy can be built up in the tank at these low impedance points. The separation and the quality factor (a measure of sharpness) of these points are affected by the coupling factor, relative value of the self-inductance and capacitance of the two tanks, the parasitic resistances of the inductors and capacitor as well as the load resistance on the receiver.

The auto-resonant driver will find one of these two points (fn1 or fn2) with the lowest impedance magnitude. As long as these two frequencies are close to each other, the receiver will be able to absorb the maximum amount of real power available from the magnetic field regardless of which frequency the auto resonant drives settles to.

PWM Auto Resonant

In a typical wireless power transfer system, the amount of energy transferrable from the transmitter to the receiver is directly proportional to the magnetic field strength generated by the transmitter. This magnetic field strength in turn is proportional to the magnitude of current flowing in the transmitting inductor.

As mentioned in the background and the auto-resonant discussion, the maximum current is developed in the transmitting inductor when the half-bridge switches are driven at the natural frequency of the series LC (at the zero phase point of the impedance curve). Therefore, one way to modulate the amount of peak current developed in the transmitting inductor is to adjust the driving frequency.

Another way to modulate the peak current of the transmitting inductor is to adjust the pulse width or the duty cycle of the driving waveform controlling the switches SW-A and SW-B in the half bridge structure, such as the switches SW-A and SW-B in FIG. 10. The maximum peak current will be developed when switches SW-A and SW-B are each driven at 50% duty cycle. This peak current will drop monotonically as the duty cycle is increased or decreased from 50%.

Figure 12:
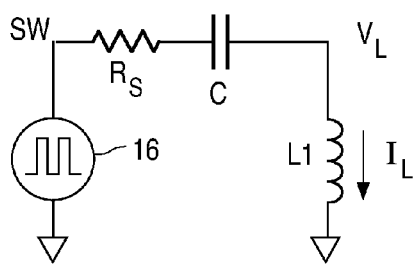
FIG. 12 is similar to FIG. 3 but is controlled in accordance with the invention.
Figure 13:
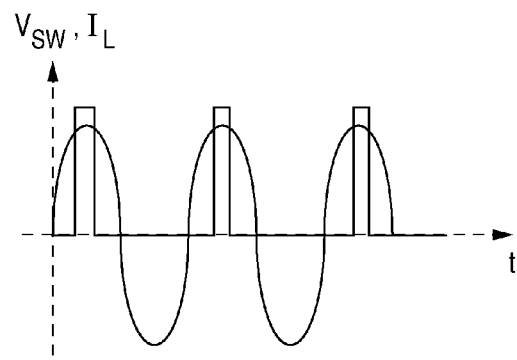
FIG. 13 illustrates the current waveform through the inductor of FIG. 12 at resonance steady state.

FIG. 12 is the same as FIG. 3 except the driving waveform is different (pulse width less than 50%) and may be in accordance with the invention. The switches are incorporated in the voltage source 16. FIG. 13 shows the steady state waveform of the SW node and the inductor L1 current $I_L$ as the SW node is driven at less than 50% duty cycle at the resonant frequency. Note that the fundamental component of the SW node waveform is still at the same frequency and exactly in-phase with the inductor L1 current waveform. Furthermore, the value of the inductor peak current is less than the peak current obtained when the SW node is driven at 50% (shown in FIG. 4).

As the pulse width is increased from 0% to 50%, the peak of the inductor L1 current increases monotonically. Therefore, one can vary the pulse width of the SW node in a half bridge to control the peak current in the transmitting inductor L1.

Note that, in the free running resonance circuit shown in FIG. 12, the center of the SW node pulse coincides with the peak of the inductor L1 current, and this SW node pulse can be phase shifted slightly positive and negative while maintaining its proportionality to the peak current of the inductor L1. One important constraint in maintaining this proportionality is that this positive going pulse has to occur when the inductor current is positive, where this positive current phase is termed the power delivery phase.

Figures 14A, 14B, 14C:
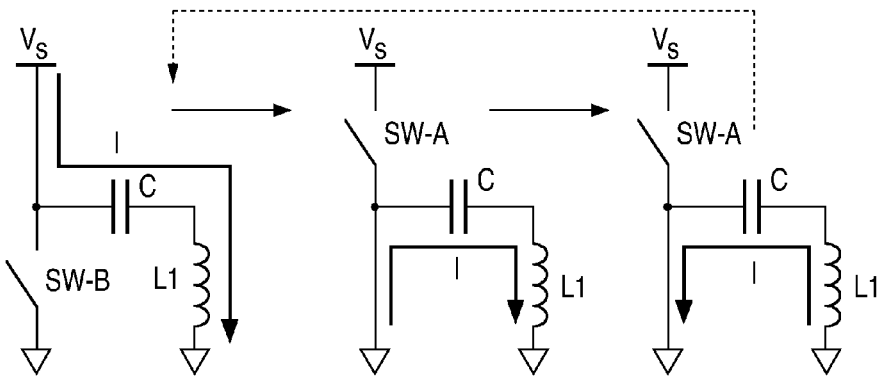
FIGS. 14A, 14B, and 14C illustrate three phases during the operation of the switches.

FIGS. 14A-C show the three phases that the circuit goes through in steady state at the resonant frequency. The power delivery phase, shown in FIG. 14A, is defined as when switch SW-A is on, switch SW-B is off, and the inductor L1 current flows out of the power supply ($V_S$). The pulse width of this power delivery phase can be modulated with respect to the other two phases in order to control the peak current in the inductor L1. The second and third phases are shown in FIGS. 14B and 14C, where the switch SW-A is off and the switch SW-B is on.

This pulse width control of the peak inductor current can be incorporated into the auto resonant circuit. FIG. 15 shows a modified Auto Resonant driver from FIG. 9 that includes this pulse width modulation control. The new components added are the OR gate 36, edge-to-one-shot 38 (generating a fixed width pulse), inverter 40, edge-to-one-shot 42, and AND gate 44.

The edge-to-one-shot 42 gates the output of the RS latch 28, converting each positive going edge to a single positive pulse whose width is proportional to the voltage at the terminal PTH of the edge-to-one-shot 42. Therefore, every time the RS latch 28 is set, switch SW-A is turned on for a period proportional to V(PTH), and switch SW-B is driven out of phase to SW-A. Refer to the discussion of FIG. 8 regarding the variation of the voltage at the SW node depending on the states of the switches SW-A and SW-B and the rising and falling of the inductor current waveform. Such variation of the voltage at the SW node is fed back to control the driver to operate at the resonant frequency, while the externally applied V(PTH) controls the pulse width.

FIG. 16 shows the SW node voltage and the inductor L current waveform generated by the circuit of FIG. 15 (using pulse width modulation by controlling V(PTH)). Note that when the switch's SW-A on duty cycle is less than 50%, the normal reset path (detecting the SW node to be higher than the $V_S$ level when the inductor current starts going negative while SW-A is on) never occurs. Therefore, the self-reset path introduced by the edge-to-one-shot 38 is necessary. The edge-to-one-shot 38 produces a reset pulse to the RS latch 28 when the inductor current waveform shape goes from negative to positive while switch SW-B is on.

Note that the presence of the reset comparator 24, comparing the SW node to the supply voltage V($V_S$), is still necessary for the circuit in FIG. 15 to ensure that the maximum duty cycle of switch SW-A is 50%. Above 50%, there will be an additional non-power delivery phase on top of the three phases shown in FIGS. 14A-C, where current will be driven into the supply ($V_S$). This extra phase does not increase or reduce the effectiveness of the structure or the overall system, but can produce undesirable behavior with many readily available unidirectional power supplies.

Full Bridge

All the preceding discussions of the auto resonant and auto resonant with pulse width modulation have used the half bridge with a series LC to show how the methods can be understood and implemented. However, these methods can be easily implemented using a full bridge driver with a series LC, as shown in FIG. 17. Switches SW-A, SW-B, SW-C, and SW-D are synchronized to achieve the resonant frequency switching and the selected pulse width modulation. The switches are controlled so that switches SW-A and SW-C are switched on or off together, and switches SW-B and SW-D are switched on or off together but opposite to the switches SW-A and SW-C.

FIG. 18 shows the Auto Resonant circuit from FIG. 9 driving the full bridge of FIG. 17. Invertors 29, 46, and 47 cause switches SW-A and SW-B to switch oppositely and cause switches SW-C and SW-D to switch oppositely to create alternating paths from $V_S$ to ground. Note that sensing is only done on the SW node but not on the SW1 node. SW-C is driven in phase with SW-A, and SW-D is driven in phase with SW-B. One practical way to view this is that instead of imposing a voltage equal to V($V_S$) and 0V at 50% duty cycle across the series LC network in the half bridge case, now the circuit imposes a voltage equal to V($V_S$) and −V($V_S$) at 50% duty cycle across the series LC network.

Figure 19:
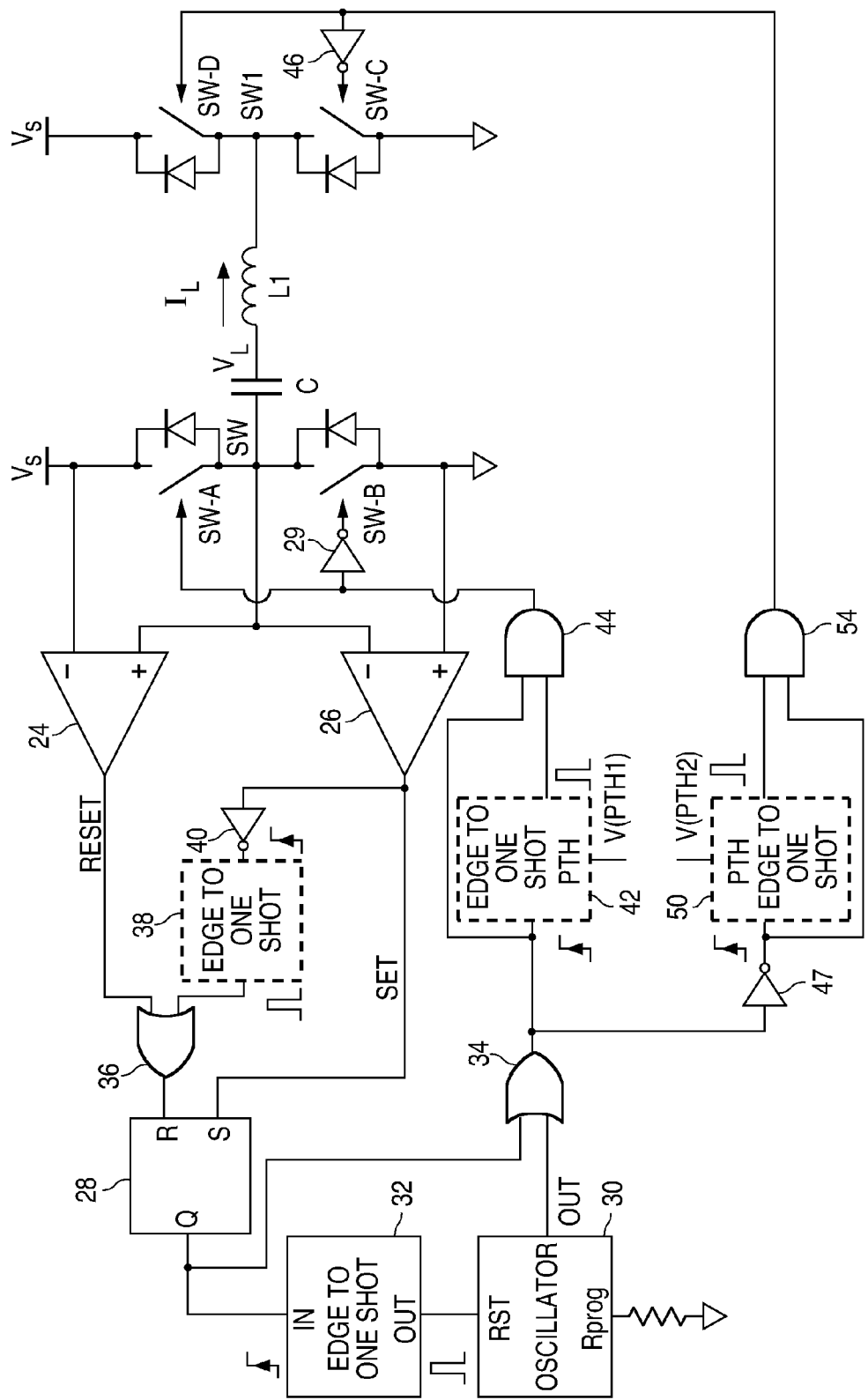
FIG. 19 adds pulse width control to the circuit of FIG. 18 to control the peak inductor current.

In order to include the pulse width modulation capability of FIG. 15 with a full bridge Auto Resonant driver, the circuit of FIG. 18 is modified as shown in FIG. 19. In FIG.

19, the additional edge-to-one-shot 50 is needed in order to modulate the pulse duration at which switch SW-D is on. The combination of edge-to-one-shot 50 and edge-to-one-shot 42 ensures that the ON pulse width of switch SW-A is exactly the same as that of switch SW-D. Invertor 47 and AND gate 54 cause the switches SW-C and SW-D to switch at a certain pulse width (set by V(PTH2)) after the OR gate 34 output goes low, while switches SW-A and SW-B switch at a certain pulse width (set by V(PTH1)) after the OR gate 34 output goes high. The edge-to-one-shot 42 and 50 circuitry can be combined and another logic configuration can be used to generate the same drive signals for the switches.

With this modification, the steady state voltage at nodes SW and SW1 (i.e., V(SW, SW1)) and inductor current waveforms are shown in FIG. 20, with an arbitrary pulse width set by V(PTH1) and V(PTH2) (from FIG. 19) of the same magnitude. Note that an additional power delivery phase, shown in FIG. 21C, is introduced, compared to the three phases shown in FIGS. 14A-C. The four switch state combinations are shown in FIGS. 21A-21D. This additional power delivery phase (FIG. 21C) does not alter the proportionality of the pulse width to the peak current in the inductor.

In FIG. 21A, the inductor current is positive and ramping up. In FIG. 21B, the inductor current is positive and ramping down. In FIG. 21C, the inductor current is negative and ramping down. In FIG. 21D, the inductor current is negative and ramping up. The power delivery phases are shown in FIGS. 21A and 21C. The frequency is at resonance, and the pulse width (set by V(PTH1) and V(PTH2)) determines the peak magnitude of the transmitter inductor current. The peak current through the transmitter inductor current controls the amount of power available at the receiver. So a lighter load on the receiver side should be accompanied by a smaller pulse width on the transmitter side so as to not supply excess current through the transmitter inductor.

Note that for simplicity the pulse widths of switches SW-A and SW-D in the example of FIG. 20 have been chosen to be the same. However, this is not a requirement. The switch SW-A and SW-D ON state pulse widths can be independent of each other, and the peak current in the inductor will be proportional to the sum of the two pulse widths.

Figure 1:
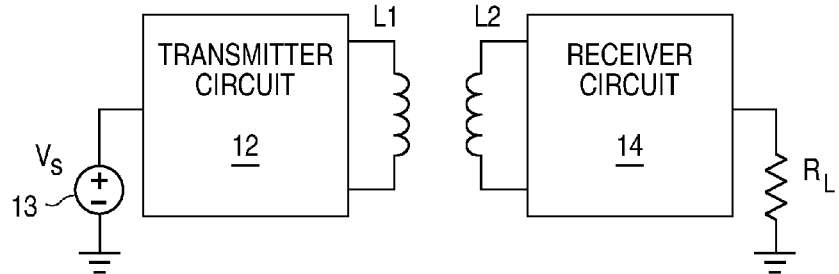
FIG. 1 illustrates a prior art system for wirelessly providing power to a load.

Detection of Receive Side Load Current by Transmitter Side to Optimize Pulse Width In a wireless power system, such as shown in FIG. 1, the receiver side usually employs a rectifier and DC-DC regulation to control the amount of power delivered to the load. This regulator may be a switching DC-DC converter or a low dropout (LDO) regulator that regulates its output voltage. For a fixed resistive load, the output voltage will control the amount of current in the load and hence the total amount of power delivered to the load.

Note however, there is no direct feedback from the receiver to the transmitter circuit. Without such feedback, the transmit circuit needs to energize the transmit inductor at a maximum level for worst case operating conditions. This worst case operating condition usually involves maximum load current and lowest coupling between the transmitter and receiver inductors. Energizing the transmitter inductor at the maximum level causes large power dissipation in the transmitter circuit as well as the transmit inductor due to non-idealities that necessarily exist in any real circuit. The most notable non-ideality is the parasitic series resistance of the transmitter inductor itself.

Therefore, energizing the transmitter inductor at its maximum level is not desirable if the receiver side (or secondary side) does not spend the majority of its operation delivering maximum power to the load. For example, if the load is a battery of a device, the device battery only needs to be charged at its full current during a short period at the beginning of each charge cycle. Other examples include an intermittent motor drive or a burst mode wireless sensor node.

In order to optimize the overall efficiency of the power transmission from the primary to the secondary side, it is apparent that feedback is necessary from the secondary to the primary side. Many methods are available and have been used in various forms.

One example involves the use of an opto-coupler to provide direct feedback information from the secondary to the primary side. Another uses a dedicated radio link with a wireless communication protocol to provide this feedback information. Other methods employ indirect observation of primary side ac waveforms by slight modulation of the secondary resonance capacitor. This modulation can then be used as a low bandwidth radio link to send the feedback information from the secondary side to the primary side.

A more drastic modulation of the secondary resonance capacitor or inductor could also be used to provide more direct information of the state of the secondary side output voltage.

The prior art techniques to provide feedback to the transmission side add substantial cost and complexity to the circuit.

The present invention uses an entirely different method to establish feedback from the secondary to the primary side which avoids drawbacks of the prior art. The method modulates the peak current in the transmitter inductor (using pulse width or power supply voltage modulation) and monitors the incremental change in peak voltage developed on the inductor itself. The transmitter inductor current is then regulated to where the incremental change in the inductor peak voltage just starts to increase. As described below, at this point where the transmitter inductor current is regulated, the receive side voltage regulator is just able to supply the target voltage to the load.

In an inductively coupled system, such as the wireless system described here, impedances from the receiver side are reflected to the transmitter side. When the receiver side employs some sort of regulation (as in the case of a DC/DC converter—linear or switching), the incremental resistive component of the reflected impedance changes from a simple resistor to a current source (in the case of an LDO) or even a negative resistance (in the case of a switching DC/DC converter).

This change in reflected impedance affects the overall quality factor (Q) at the transmitter inductor port. Specifically, using the PWM auto resonant driver discussed previously, as the pulse width is slowly varied, the receiver-side regulation can be detected by monitoring the incremental change of the voltage build up on the transmitter inductor. Using another way, the pulse width can be fixed at a certain value, and the supply voltage of the resonant driver is slowly varied. Again, the receiver-side regulation can be detected by monitoring the incremental change of the voltage build up on the transmitter inductor.

Note that by increasing the pulse width or the supply voltage of the PWM auto resonant driver, the driver is effectively trying to increase the current in the transmitter inductor. As mentioned before, the magnetic field strength generated by the transmitter inductor is directly proportional to the current in the transmitter inductor. Corollary to that, the total amount of power available on the receiver side is directly proportional to the strength of the magnetic field the receiver inductor is placed in.

Before the receiver circuit achieves any regulation, the reflected impedance of the load looks like a simple resistance, affecting the overall Q of the system the auto-resonant driver is trying to lock on to. This is because the input voltage into the receiver's voltage converter is below the target regulated voltage, and the converter's power switch (assuming a switching buck type regulator) is simply on virtually 100% of the time in attempt to achieve the target voltage. Therefore, any incremental pulse width or incremental supply voltage will only increase the voltage (and current) build up in the transmitter series LC tank limited by this overall Q.

On the other hand, as soon as the receiver circuit achieves regulation, the reflected impedance from the receiver to the transmitter dramatically changes. In the case of a DC/DC switching converter, the reflected incremental resistance changes from a positive resistance to a negative resistance, in comparison with an LDO where it changes from some positive resistance to a larger resistance value. In the case of a buck regulator, as soon as the input voltage rises above the target regulated voltage, the power switch's PWM switching starts and the duty cycle will start dropping below 100%. Thus, there are times when the converter's power switch is off and the effective resistance seen at the converter input increases along with the reflected value to the transmitter. Therefore, at and after this point, any increase in the pulse width or supply voltage will increase the voltage (and current) build up in the primary LC tank by a substantially larger amount as allowed by the new higher Q of the overall system.

What makes this effect even stronger is the inherent positive feedback that exists with this process. When the converter's input voltage starts to rise above the target regulated voltage, the reflected resistance grows, which allows the voltage on the transmitter inductor to grow higher with the same pulse width at the transmitter driver. When the voltage on the transmitter inductor grows, so does the input voltage into the receiver's converter, which further cause the converter to reduce its duty cycle and hence causes the resistance to grow further. This effect continues until the voltage build up on the transmitter is as high as it can go with the existing pulse width, and all the extra power is consumed by the parasitic resistances associated with building up the voltage and current on the transmitter and receiver coils.

Therefore, this new method seeks to sense the receiver-side regulation by detecting the change in the incremental Q of the overall system. And in the case of the PWM auto resonant driver system, this is done by monitoring the incremental change in the primary LC tank peak voltage (or peak current) as the pulse width of the power delivery phase or the supply voltage is increased.

Figure 23:
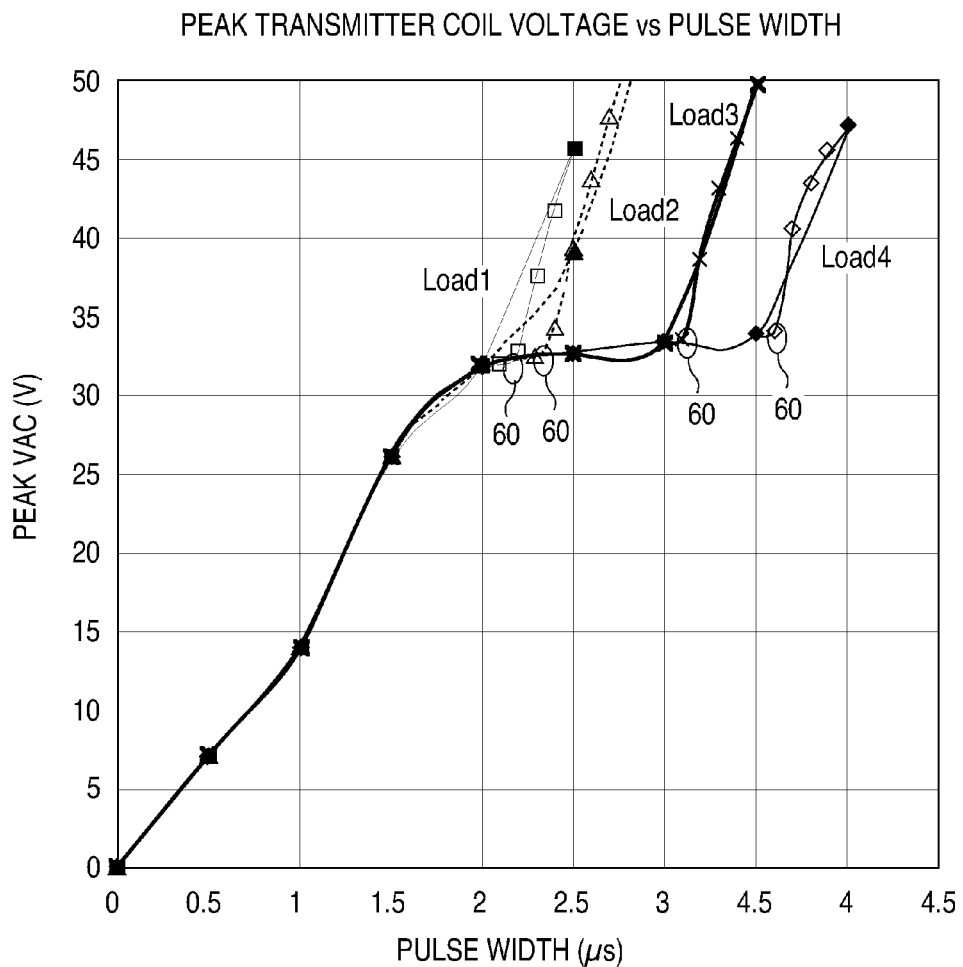

For a typical setup of a transmitter circuit driving a transmit inductor in the presence of a receiver inductor, the graph of FIG. 22 shows the variation of the peak transmit inductor voltage when the power delivery phase pulse width of the PWM auto resonant driver (resonant frequency at approximately 100 kHz) is swept from 0-3.5 microseconds and the receiver contains a buck regulator (having a target regulated voltage of 5V) powering a fixed resistive load. FIG. 23 shows the variation of the peak transmit inductor voltage when the power delivery phase pulse width of the same PWM auto resonant driver is swept from 0-4 microseconds and the receiver contains a voltage regulator (having a target regulated voltage of 5V) powering various resistive loads. Note that these graphs are typical for any receiver-side circuit that employs some kind of efficient regulation.

In the presence of an ever increasing amount of available power from the transmitter inductor, the reflected impedance increases significantly when regulation is achieved. The change in slope in the graph reflects the point when the reflected impedance increases significantly. Therefore, the pulse width at which the slope increases sharply, such as with a 3 microsecond pulse width in FIG. 22, is where the voltage regulator in the receiver side has just received sufficient power from the receiver inductor to output the target regulated 5V. Prior to that point, the voltage regulator (even at its highest duty cycle of approximately 100%) could not generate the target 5V. The sharp increase in the reflected impedance is due to the voltage regulator suddenly having a duty cycle less than 100% once regulation is achieved. The magnitude of this change in reflected impedance will vary depending on several factors such as the transmitter and receiver inherent quality factors, the coupling between the two inductors, and the load at the receiver output at regulation. But most importantly there is always a change in gradient. Note that, in FIG. 23, it took a wider drive pulse width for the voltage regulator to achieve regulation for the Load 4 because the Load 4 (having a smaller resistance than the Load 1) required a higher current to achieve the 5V regulated voltage.

Therefore, at or about the inflection point, the most efficient use of power is achieved (there is a minimum of excess power generated by the transmit inductor).

The present invention periodically modulates (e.g., drops then ramps up) the pulse width of the power deliver phase to sense the point where this change in gradient occurs and regulates the pulse width of the PWM resonant driver at or near this point. This method enables direct sensing of secondary power consumption from the transmitter side thereby allowing the driver to energize the inductor just enough to achieve the receiver side regulation. This reduces any standing losses in the primary circuit, optimizing the overall system efficiency. These optimum operating points are indicated by the dots 60 in the graphs of FIGS. 22 and 23.

Figure 24:
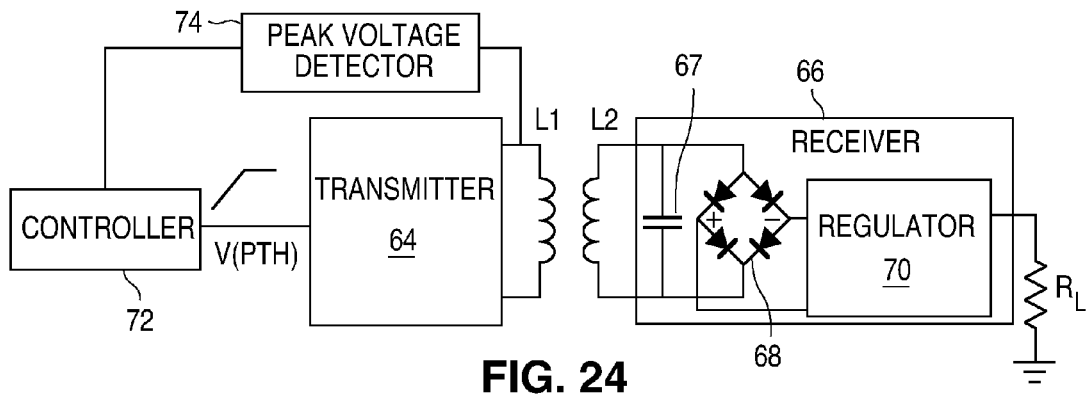
FIG. 24 illustrates an embodiment of a power transmission system where important elements are shown for optimally driving the transmitter inductor to achieve maximum efficiency, based on the peak voltage detected on the transmitter inductor while ramping up the driving pulse width (or supply voltage) for driving the transmitter inductor.

FIG. 24 illustrates a high level depiction of one embodiment of the invention. The transmitter 64 contains an auto-resonant driver, such as shown in FIG. 19, where the driving pulse width is set by a pulse width control voltage V(PTH). The receiver 66 contains a resonant capacitor 67, a rectifier 68 and a voltage regulator 70 powering a load $R_L$ at a target regulated voltage. A smoothing capacitor (not shown), or other low pass filter, smooths out the ripples to provide a substantially DC input voltage into the regulator 70. The regulator 70 may be any type of regulator using a power switch, such as a buck switching regulator using PWM, wherein an output voltage of the regulator is sensed to generate a feedback voltage to control the duty cycle of the regulator power switch, whereby the duty cycle is regulated to cause the feedback voltage to match a reference voltage to achieve the target regulated voltage. One type of regulator is described in U.S. Pat. No. 5,731,731, assigned to the present assignee and incorporated herein by reference. The regulator may also be an LDO regulator, where the LDO regulator's series power device is fully conductive prior to regulation and partially conductive after regulation. A controller 72 periodically sweeps V(PTH) while sensing the inductor's L1 peak voltage, detected by a peak voltage detector 74. The peak voltage detector 74 may be any conventional circuit that receives an AC voltage and generates a value corresponding to the peak voltage. When the power generated by the receiver inductor L2 is sufficient to enable the regulator 70 to output the target regulated voltage, the controller 72 senses the resulting increase in the peak voltage of the transmitter inductor L1 and stops sweeping V(PTH). This results in a pulse width that causes the transmitter inductor L1 to supply just enough power to achieve the voltage regulation. The controller 72 periodically performs the sweeping and detection operation since the parameters of the system may change.

In one embodiment, the peak current supplied to the transmitter inductor L1 is just enough to achieve regulation by the voltage regulator. In another embodiment, the peak current supplied to the transmitter inductor L1 is set to a level equal to or above than that needed for the voltage regulator to achieve regulation but below a level that is 25% more than that needed for regulation to ensure regulation is maintain despite variations in certain parameters.

The receiver 66 may be entirely located in a hand-held device that periodically placed proximate to the transmitter inductor L1 for recharging a battery. The spacing between the receiver inductor L2 and the transmitter inductor L1 should be a minimum as practical for the application, such as less than 1 cm.

Figure 25:
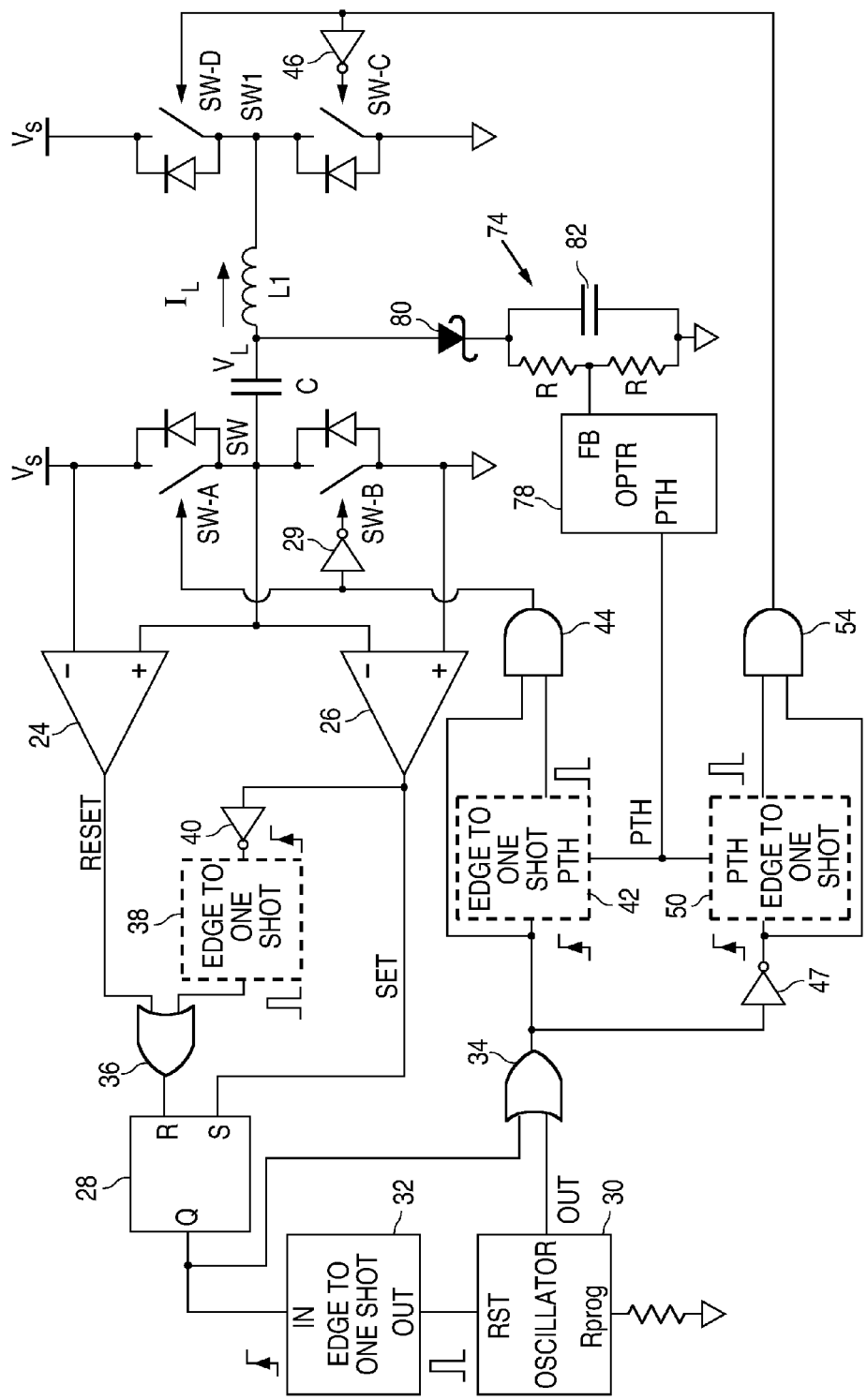
FIG. 25 is a possible embodiment of the transmitter circuit of FIG. 24.

FIG. 25 shows another possible setup for optimally controlling the pulse width that includes the circuit of FIG. 19. The power delivery pulse width is adjusted by the Optimum Power Transfer Regulator (OPTR) module 78 which outputs V(PTH). The OPTR module 78 performs the gradient detection and optimum point search by sensing the peak voltage developed on the transmitter inductor L1 and modulating V(PTH). The peak voltage detector is formed by the combination of the diode 80, the capacitor 82, and the resistors R. The circuitry for the OPTR module 78 is fairly simple and can be easily designed by those skilled in the art. A timer may then initiate a new measurement cycle after a period of time.

Various algorithms can be implemented to perform the gradient detection and pulse width modulation to find the optimum point.

One simple algorithm is as follow:
1. At start up, continuously increase the pulse width at a fixed step size, sampling and storing the peak voltage developed at the transmit inductor at each step.
2. Find the difference between the current peak voltage value ($V_1$) and the value at the previous step ($V_0$), and thus generate a value proportional to the gradient of the peak-voltage as the pulse width is swept.
3. Compare this value against a pre programmed value ($\Delta V_{ref}$) to determine whether the optimum pulse width has been reached.
4. Once the optimum pulse width is reached, the voltage stepping is paused for a pre-programmed time ($T_d$).
5. Once $T_d$ expires, the pulse width is continuously stepped down with the same step size as before, until the gradient value decreases below $\Delta V_{ref}$.
6. The pulse width is then stepped up again one or two steps until the gradient is greater than $\Delta V_{ref}$ again.

With this algorithm, the pulse width to the driver is continually adjusted to the optimum value to deliver just enough power for the receiver circuit to achieve regulation. An alternative method may be performed by increasing the supply voltage instead of the pulse width.

The $\Delta V_{ref}$ value mentioned in the proposed algorithm above can be set by initially calibrating the system and finding out the reliable and acceptable resolution for optimum efficiency.

Td can be set similarly by finding the minimum frequency such adjustments need to be done for a particular system to ensure that the system maintains optimal power efficiency. The choice for Td value needs to consider how fast the receiver load changes and what is the acceptable delay for the primary to react to such changing load. The settling speed of both the transmitter and the receiver circuit needs to be taken into account.

Even though the point where the gradient changes indicates the optimum operating condition, in practical implementation the pulse width is usually regulated just beyond this point. This is to ensure that any random offsets and slight variation in load currents do not cause the receiver circuit to immediately go out of regulation.

In order for random offsets and other systematic inaccuracies in the system to be a non-factor, good primary and the secondary self-efficiency is important. This is to ensure that the change in gradient is significant enough for detection. This is reasonable to assume since, in a well-designed system, most power is delivered on the secondary load instead of used up by inefficiencies in the system.

For systems with really weak coupling (less than 0.1 coupling factor) or low power (less than 100 mW), this detection method may not be suitable since the change in gradient reflected on the transmitter side may be small enough that the cost of the system overhead to detect such small change will be too expensive in term of power, circuit complexity, and real estate.

More sophisticated algorithms can be implemented to detect this gradient change with the same ultimate goal of regulating the pulse width of the power delivery phase to optimize overall system power efficiency.

A simple extension of the described algorithm would be to sweep the pulse width at a minimum voltage supply. If the optimum point is not found when the pulse width duty cycle reaches its maximum (50%), then continue the search while ramping up the voltage supply until the optimum point is found.

Furthermore, this method is also easily extended to include multiple receiver inductors. As long as each of the receiver circuits regulates its own power consumption, the same method can be used on the transmitter side to detect the point where all the receiver circuits are in regulation. Multiple gradient changes will be visible on the transmitter inductor peak voltage, and the last gradient change point indicates when all the receiver circuits are in regulation. The driver pulse width or supply voltage is then regulated at this last point.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:
1. A power transmission system for wirelessly supplying power to a load comprising:
    a transmitter inductor;
    a first switch coupled between a voltage source and the transmitter inductor and controlled to generate a varying current through the transmitter inductor;
    a receiver inductor magnetically coupled to the transmitter inductor;
    a voltage regulator receiving power from the receiver inductor to generate a regulator output voltage;

a load coupled to an output of the voltage regulator, wherein power in the transmitter inductor is wirelessly coupled to the receiver inductor for being converted to a regulated voltage by the regulator for driving the load;

a peak voltage detector coupled to detect a peak voltage on the transmitter inductor, wherein a peak voltage on the transmitter inductor is affected by an ability of the voltage regulator to achieve regulation for driving the load; and a controller for controlling a peak current through the transmitter inductor, the controller being controlled to modulate the peak current through the transmitter inductor so as to modulate a peak current through the receiver inductor, wherein the peak voltage on the transmitter inductor increases during a time when the voltage regulator is able to achieve regulation, wherein the controller is configured to variably increase and decrease the peak current through the transmitter inductor, by modulating the peak current through the transmitter inductor, to detect a level of the peak current through the transmitter inductor that corresponds with the increase of the peak voltage as a result of the voltage regulator achieving regulation, and wherein the controller is controlled to temporarily cease modulating the peak current through the transmitter inductor, as a result of detecting the increase of the peak voltage, to limit the peak current through the transmitter inductor to a level adequate to supply sufficient voltage to the voltage regulator necessary to achieve regulation.

2. The system of claim 1 wherein the controller is controlled to modulate the peak current through the transmitter inductor by modulating the voltage generated by the voltage source.

3. The system of claim 1 wherein the controller is controlled to modulate the peak current through the transmitter inductor by modulating a pulse width of driving pulses applied to the first switch.

4. The system of claim 1 wherein the receiver inductor is housed along with the load in a device for recharging a battery in the device.

5. A power transmission method for wirelessly supplying power to a load comprising:

providing a transmitter inductor;

controlling a first switch, coupled between a voltage source and the transmitter inductor, to generate a varying current through the transmitter inductor;

providing a receiver inductor magnetically coupled to the transmitter inductor;

receiving power from the receiver inductor by a voltage regulator to generate a regulator output voltage;

providing a load coupled to an output of the voltage regulator, wherein power in the transmitter inductor is wirelessly coupled to the receiver inductor for being converted to a regulated voltage by the regulator for driving the load;

detecting a peak voltage on the transmitter inductor, wherein a peak voltage on the transmitter inductor is affected by an ability of the voltage regulator, receiving power from the receiver inductor, to achieve regulation for driving the load;

controlling a peak current through the transmitter inductor, the controller being controlled to modulate the peak current through the transmitter inductor so as to modulate a peak current through the receiver inductor, wherein the peak voltage on the transmitter inductor increases during a time when the voltage regulator is able to achieve regulation;

variably increasing and decreasing the peak current through the transmitter inductor, by modulating the peak current through the transmitter inductor, to detect a level of the peak current through the transmitter inductor that corresponds with the increase of the peak voltage as a result of the voltage regulator achieving regulation; and as a result of detecting the increase of the peak voltage, temporarily ceasing modulating the peak current through the transmitter inductor to limit the peak current through the transmitter inductor to a level adequate to supply sufficient voltage to the voltage regulator necessary to achieve regulation.

6. The method of claim 5 wherein the controller is controlled to modulate the peak current through the transmitter inductor by modulating the voltage generated by the voltage source.

7. The method of claim 5 wherein the controller is controlled to modulate the peak current through the transmitter inductor by modulating a pulse width of driving pulses applied to the first switch.

8. The method of claim 5 wherein the receiver inductor is housed along with the load in a device for recharging a battery in the device.

9. The method of claim 5 wherein the step of temporarily ceasing modulating the peak current comprises temporarily ceasing modulating the peak current so that the peak current is set to a level less than 25% above that required for the voltage regulator to achieve regulation.

10. The system of claim 1 wherein the controller is controlled to temporarily cease modulating the peak current so that the peak current is set to a level less than 25% above that required for the voltage regulator to achieve regulation.

* * * * *